G. M. GULLICK.
COUPLING.
APPLICATION FILED DEC. 16, 1919.

1,376,332.

Patented Apr. 26, 1921.
2 SHEETS—SHEET 1.

Inventor
Geoffrey M. Gullick
by
his Atty

G. M. GULLICK.
COUPLING.
APPLICATION FILED DEC. 16, 1919.
1,376,332.
Patented Apr. 26, 1921.
2 SHEETS—SHEET 2.
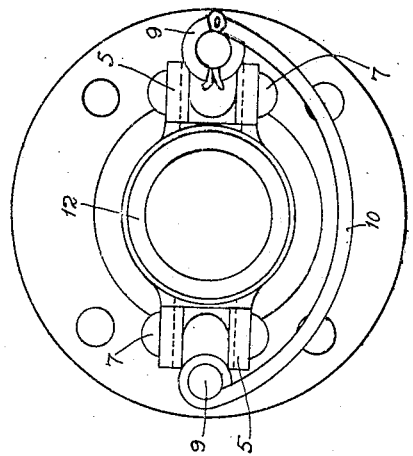
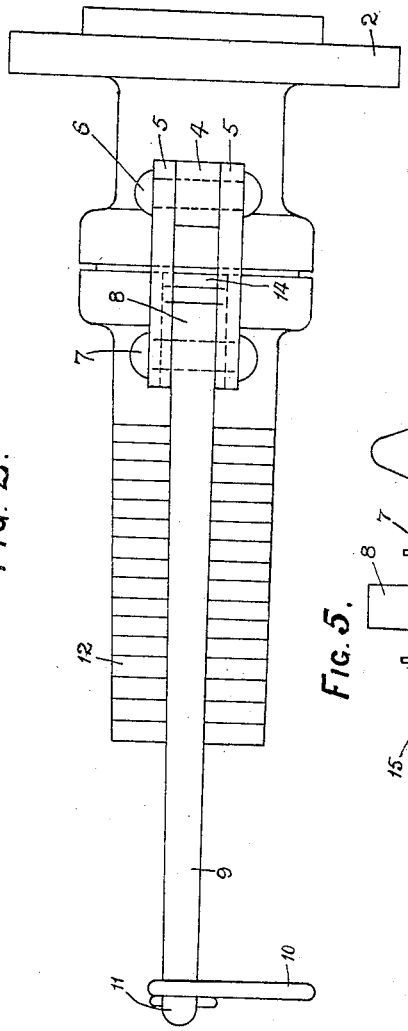
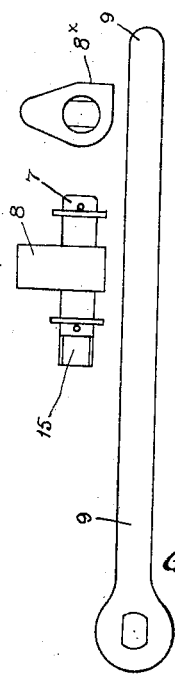
Inventor
Geoffrey M. Gullick
by his Atty

UNITED STATES PATENT OFFICE.

GEOFFREY MERTON GULLICK, OF HIGHFIELD, NEAR WIGAN, ENGLAND.

COUPLING.

1,376,332.　　　　　Specification of Letters Patent.　　Patented Apr. 26, 1921.

Application filed December 16, 1919. Serial No. 345,252.

*To all whom it may concern:*

Be it known that I, GEOFFREY MERTON GULLICK, a subject of the King of England, and residing at Highfield, near Wigan, in the county of Lancaster, England, have invented Improvements in or Connected with Couplings, of which the following is a specification.

This invention has reference to mechanical pipe couplings of the kind by which a length of pipe can be readily coupled up with another length of pipe, and readily uncoupled therefrom. One of the coupling parts may be on or connected with a rigid pipe, and the other with a flexible pipe of leather, canvas, rubber or the like; or both parts of the coupling may be on or connected with two rigid pipes or two lengths of flexible pipe.

In the coupling hereinafter described it will be assumed that one contact part of it will be a spigot, and the other a socket or faucet, the socket or faucet part containing rubber, leather, or other comparatively soft material which serves as the jointing against which the spigot will press when the parts are coupled up.

One part of the coupling has fitted to it pivoted links, and to these links, levers are pivoted; while on the other coupling part projecting tongues or brackets or a flange are furnished, upon which the levers are adapted to act, and in action, press the spigot onto the socket, that is, one part firmly on to the other; and in the case where the operating parts or handles of the levers form portions of the aforesaid levers, they are so arranged that when the complete movement is effected, these levers will be parallel with the axis of the coupling, or making an acute angle of a few degrees with the axis, so that much power or purchase is produced, and they will keep in this position of themselves. And, if desired, in some cases, the two levers will have a link or chain or other fastening between the ends of their long arms, so that they are positively held in this position.

Figure 3:
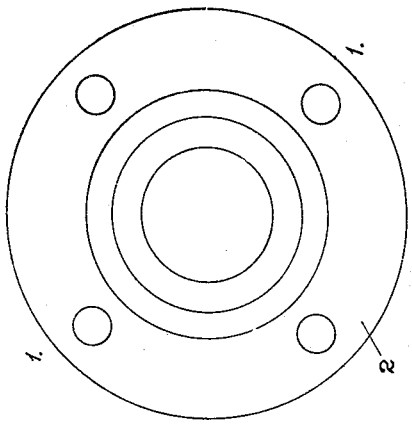
Figure 1:
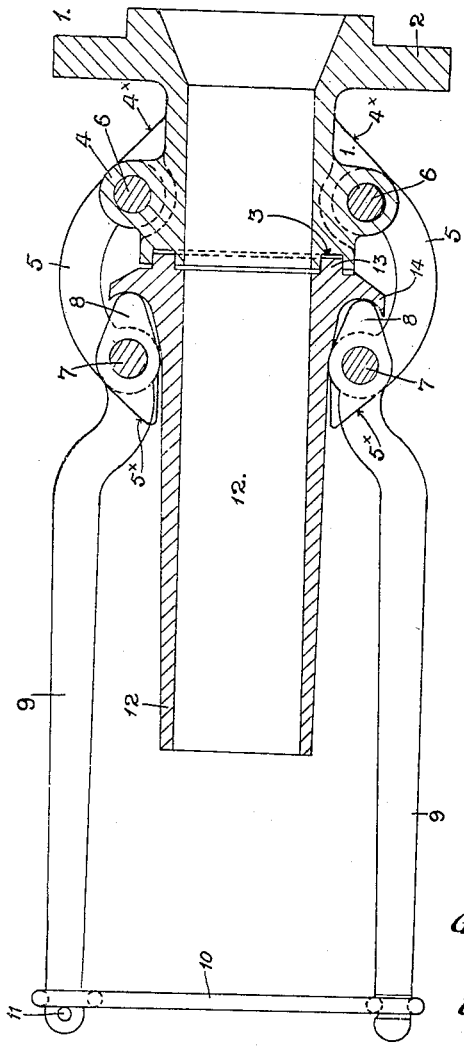

The invention will be further described with reference to the accompanying drawings which illustrate it, and in which Figure 1 is a longitudinal section; Fig. 2 an outside view at 90° from that of Fig. 1; Fig. 3 is an end view seen from the right hand end, and Fig. 4 an end view seen from the left hand end. Fig. 5 illustrates a slight modification of the coupling apparatus.

The coupling shown in the drawings, is one in which the spigot is on a metal tubular part to which a flexible pipe is to be attached, and in the other part an annular socket or faucet is formed, which may contain rubber, leather or other comparatively soft material in the bottom, against which the spigot will press when the coupling is coupled up.

In the case shown, the part 1 represents the rigid portion of the coupling, which is provided with a flange 2 adapted to be fastened to say the end of a rigid pipe, and it has on its outer end the annular socket or faucet 3, which as stated will be fitted with a joint washer or ring; and on the outside of this portion, and on opposite sides, are lugs 4 to each of which a pair of curved links 5 are connected by pivot pins 6, and these links carry at their opposite ends operating levers by hinge pins 7, the levers consisting of short arms 8, and long arms 9. On the end of one lever 9, there is a link 10 which is bowed as shown, and the opposite end of it is provided with an eye which is adapted to fit over the long arm of the other lever, when the coupling is connected up, and in operation, and this link is kept in place by a pin 11 or the like.

The spigot portion to which the flexible part or length of pipe is to be attached, is marked 12, 13 being the spigot; and on this portion of the coupling projecting tongues or brackets 14 are provided, on the undersides of which the short arms 8 of the operating levers are adapted to bear, and in action, press the spigot into the socket, and the one part of the coupling firmly on to the other.

The under contact surfaces of these brackets or tongues 14 are curved as shown, or tapered, at the part the short arms 8 act on.

In the case shown, the parts are so arranged that the water tight joint will be effected between the spigot and socket of the coupling when the operating levers are in the position shown, the axes 7 of the short arms 8 of the lever being nearer the axis than the point of contact of the tip of the levers with the brackets 14, in which case the link 10 affords an additional means of security against the levers being moved accidentally from the coupled position.

In action, the spigot end 13 of the coupling would be inserted in the socket when the levers and their links are spread apart; and then the levers will be brought around toward the spigot portion 12, being free so to do by the pivoted links 5; and when in this position, the levers will be moved together, so that their short arms 8 act upon the under surfaces of the brackets 14, and press the two parts together, so making a firm and fluid tight joint.

Regarding the modification shown in Fig. 5, the lever portions 8 are formed part of or are fixed on pins 7, which will be carried by the links 5, similarly as set forth with reference to Figs. 1 to 4; and one end of these pins 7 has flat sides at 15, and is adapted to receive the head—which has a corresponding aperture—at the end of the lever 9, which form the long arms of the complete lever; and this lever 9 may be readily attachable and detachable so that it can be fitted on to the pin 7 in coupling up the coupling, or removed in uncoupling it, as and when desired. The short arm of the lever in this case has a flat part $8^x$ which comes next the part 12 of the coupling.

In the preferred use of the invention as for coupling together two lengths of hose the lugs would be extended at an inclination as shown by the dotted lines $4^x$ in Fig. 1, and the outer ends of the links 5 would be extended as shown by the dotted lines $5^x$, so that in pulling the coupling over an object or depression or the like, it will slide easily over it, there being nothing to catch.

What is claimed is:—

A pipe coupling having the members formed for an interfitting connection, one of said members having pivotally mounted diametrically opposed links, a lever pivotally supported in the free end of each link and having a short arm projected in one direction beyond its pivot and a laterally off-set long arm projected in the opposite direction beyond the pivot, and bearing tongues carried by the other member of the coupling to be engaged by the short arms of the levers in the coupling operation, the arm engaged surface of said tongues being rounded, the lever supported end of the links bearing directly upon the surface of one of the coupling members to provide fulcrums for the operation of the levers.

In testimony whereof, I have signed my name to this specification in the presence of two subscribing witnesses.

GEOFFREY MERTON GULLICK.

Witnesses:
 SOMERVILLE GOODALL,
 ALICE PERKINS.